US009568106B2

(12) United States Patent
Khonsari et al.

(10) Patent No.: US 9,568,106 B2
(45) Date of Patent: Feb. 14, 2017

(54) MECHANICAL SEAL WITH TEXTURED SIDEWALL

(75) Inventors: Michael M. Khonsari, Baton Rouge, LA (US); Nian Xiao, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 56 days.

(21) Appl. No.: 13/102,299

(22) Filed: May 6, 2011

(65) Prior Publication Data

US 2012/0274029 A1    Nov. 1, 2012

Related U.S. Application Data

(60) Provisional application No. 61/480,850, filed on Apr. 29, 2011.

(51) Int. Cl.
*F16J 15/38* (2006.01)
*F16J 15/34* (2006.01)

(52) U.S. Cl.
CPC .................. *F16J 15/3404* (2013.01)

(58) Field of Classification Search
USPC ........ 277/405, 358, 406, 399, 400, 360, 359
See application file for complete search history.

(56) References Cited

U.S. PATENT DOCUMENTS

| | | | | |
|---|---|---|---|---|
| 3,822,066 A | * | 7/1974 | Keys | 277/405 |
| 4,714,257 A | * | 12/1987 | Heinrich et al. | 277/307 |
| 4,908,081 A | * | 3/1990 | Heinrich et al. | 156/89.25 |
| 4,997,192 A | * | 3/1991 | Nagai et al. | 277/400 |
| 5,238,253 A | * | 8/1993 | Sieghartner | 277/408 |
| 5,934,683 A | * | 8/1999 | Sieghartner | 277/400 |
| 6,845,985 B2 | * | 1/2005 | Kraus | 277/405 |
| 6,902,168 B2 | * | 6/2005 | Tejima | 277/399 |
| 6,928,922 B2 | * | 8/2005 | Nagai et al. | 92/160 |
| 6,938,879 B2 | * | 9/2005 | Bancroft et al. | 251/306 |
| 6,942,219 B2 | * | 9/2005 | Khonsari et al. | 277/360 |
| 2003/0102632 A1 | * | 6/2003 | Duta et al. | 277/500 |
| 2009/0200749 A1 | * | 8/2009 | Teshima et al. | 277/512 |

* cited by examiner

*Primary Examiner* — Kristina Fulton
*Assistant Examiner* — Eugene G Byrd
(74) *Attorney, Agent, or Firm* — John B. Edel; Edel Patents LLC

(57) ABSTRACT

The present invention discloses a mating ring, a primary ring, and associated mechanical seal having superior heat transfer and wear characteristics. According to an exemplary embodiment of the present invention, one or more dimples are formed onto the cylindrical outer surface of a mating ring sidewall and/or a primary ring sidewall. A stationary mating ring for a mechanical seal assembly is disclosed. Such a mating ring comprises an annular body having a central axis and a sealing face, wherein a plurality of dimples are formed into the outer circumferential surface of the annular body such that the exposed circumferential surface area of the annular body is increased. The texture added to the sidewall of the mating ring yields superior heat transfer and wear characteristics.

43 Claims, 6 Drawing Sheets

MECHANICAL SEAL WITH TEXTURED SIDEWALL

CROSS-REFERENCE TO RELATED APPLICATIONS

The present application claims the benefit of prior U.S. Provisional Application No. 61/480,850, filed Apr. 29, 2011, which is hereby incorporated by reference.

STATEMENT OF GOVERNMENT-SPONSORED RESEARCH

This invention was made with government support under the following contracts:
U.S. Department of Energy Grant No. DE-FG48-02R810707
The government has certain rights in the invention.

FIELD

The present invention relates generally to the field of mechanical seals.

BACKGROUND

Mechanical face seals are used to control leakage from pumps, mixers, agitators, and the like. Seals are among the most crucial components of industrial machinery. If a seal fails prematurely, it can have significant economic and environmental consequences.

A basic mechanical seal is a mechanically loaded device consisting of a rotating (primary) ring and stationary (mating) ring, having lapped faces that operate in close proximity under hydraulic pressure from fluid containment as well as the spring force that pushes the rings together to minimize the leakage between the rotating shaft and the stationary housing. A common material used in primary rings is carbon graphite, and ceramic, stainless steel, tungsten carbide and silicon carbide are popular materials for use in mating rings. Coolant (flush fluid) may be supplied to lubricate and remove heat from the interface between the two rings.

Most mechanical seals fail long before they wear out, with high temperatures identified as some of the main causes of their failure. Heat is generated at the interface as the primary ring rubs against the mating ring during operation. Too much heat can cause thermal distortions on the seal face and accelerate wear, and thus increase the leak path. Further, heat effects are known to be responsible for thermo-elastic instabilities (TEI) that occur due to high speeds and high loads, particularly if the seal material is prone to heat checking. These instabilities give rise to the formation of macroscopic hot spots on the seal faces interface. Hot spots may expand relatively more than adjacent areas, causing higher local pressures that act on the surface and generate more frictional heating. This is analogous to a positive feedback loop in a control system, causing thermally induced instability.

Both conduction and convection heat transfer play a significant role on the performance of a mechanical seal. Since heat conduction occurs as heat flows through the primary ring and mating ring, the thermal conductivity of these materials is important. In addition, heat generated at the interface between the mating and rotating ring is dissipated into the flush fluid through the process of convective heat transfer. In order to remove the heat generated at the faces very quickly, a high heat transfer coefficient and/or a larger wetted area is needed. Heat transfer from seal face is mostly dissipated through axial and radial directions. Therefore, increasing the wetted area in the axial and radial directions can be considered for improving heat transfer. However, an increase in the surface area is not always possible due to space and/or design limitations. Therefore, new heat transfer augmentation techniques are needed to reduce interface temperature.

There are many heat transfer augmentation techniques employed in the engineering field, such as pin fins, rib turbulators, and dimpled surfaces. Dimples may be defined as pits, bores, holes, or any other depressions formed into a surface. Dimples can be easily fabricated using such techniques as a laser engraving machine, which can quickly "burn" textures on different material from carbides to metals, or any other suitable technique. Arrays of surface dimples are used in wide variety of practical applications such as electronics cooling, heat exchangers, turbine blade internal cooling passages, etc. However, most of studies on utilizing dimpled surfaces in mechanical seals consider turbulent flows at high Reynolds numbers while studies pertaining to thermal performance for dimpled surfaces in laminar flows are, quite rare.

Some studies have examined the placement of dimples on the active surface of the mating ring of a mechanical seal. While such placement may achieve a desired effect on the friction generated between the mating ring and the stationary ring, texturing the active surface of the mating ring may create an additional load-carrying capacity with each dimple such that the summation of all of them could created a lifting force. Such a lifting force may separate the faces and thus create a leak path and thus render the seal ineffective. Further, considering a seal in which the active surface has been lapped to within 2 helium light bands (a common practice), adding dimples to the active surface would require a second lapping step after the dimples are added, thus introducing a greater expense and complexity to the manufacturing process. Additionally, other recent studies suggest that adding dimples or otherwise texturing the active surface of the mating ring may lead to increased wear.

Other recent studies regarding the use of dimple textures in mechanical seals are associated with an internal cooling process whereby the coolant is pumped through small channels with dimpled surfaces. However, such designs likely require potentially drastic changes to existing seal configurations, the flush plan, and/or the use of additional auxiliary parts in order to accommodate the internal cooling process. Accordingly, there is currently an unfilled need for a mechanical seal with superior heat transfer and wear characteristics that nevertheless functions with conventional mechanical seal configurations.

SUMMARY

The present invention discloses a mating ring, a primary ring, and associated mechanical seal having superior heat transfer and wear characteristics. According to an exemplary embodiment of the present invention, one or more dimples are formed onto the cylindrical outer surface of a mating ring sidewall and/or a primary ring sidewall. Coolant impinges onto the cylindrical surface through a nozzle situated above the mating ring and the flow is stirred by the rotation of primary ring, as in a conventional seal. An engraved mating ring can be directly used in any seal housing chamber without changing its original design or the flush plan.

BRIEF DESCRIPTION OF THE DRAWINGS

FIG. 1a is a close-up view of the interface between the mating ring and stationary ring of the mechanical seal assembly of FIG. 1.

FIGS. 2 and 2a are side and isometric views, respectively, of a mating ring according to an exemplary embodiment of the present invention.

DETAILED DESCRIPTION

With respect to the descriptions that follow, an objective of the present invention is to provide a mating ring that will provide improved thermal performance over an existing conventional ring design. It is a further objective of this invention to provide a mating ring offering superior thermal performance that is nevertheless compatible with conventional mechanical seal configurations without requiring any retrofits or additional parts or equipment.

In order to remove the heat generated at the interface between the primary ring and the mating ring, a high heat transfer coefficient and/or a larger wetted area (i.e., area in contact with a cooling fluid) is needed. Heat transfer from a seal face is mostly dissipated through the axial and radial directions. Therefore, increasing the wetted area in the axial and radial directions can be considered for improving heat transfer. Such an increase in surface area may be achieved through the introduction of "dimples" onto the exterior surface of the mating ring.

Figure 1:
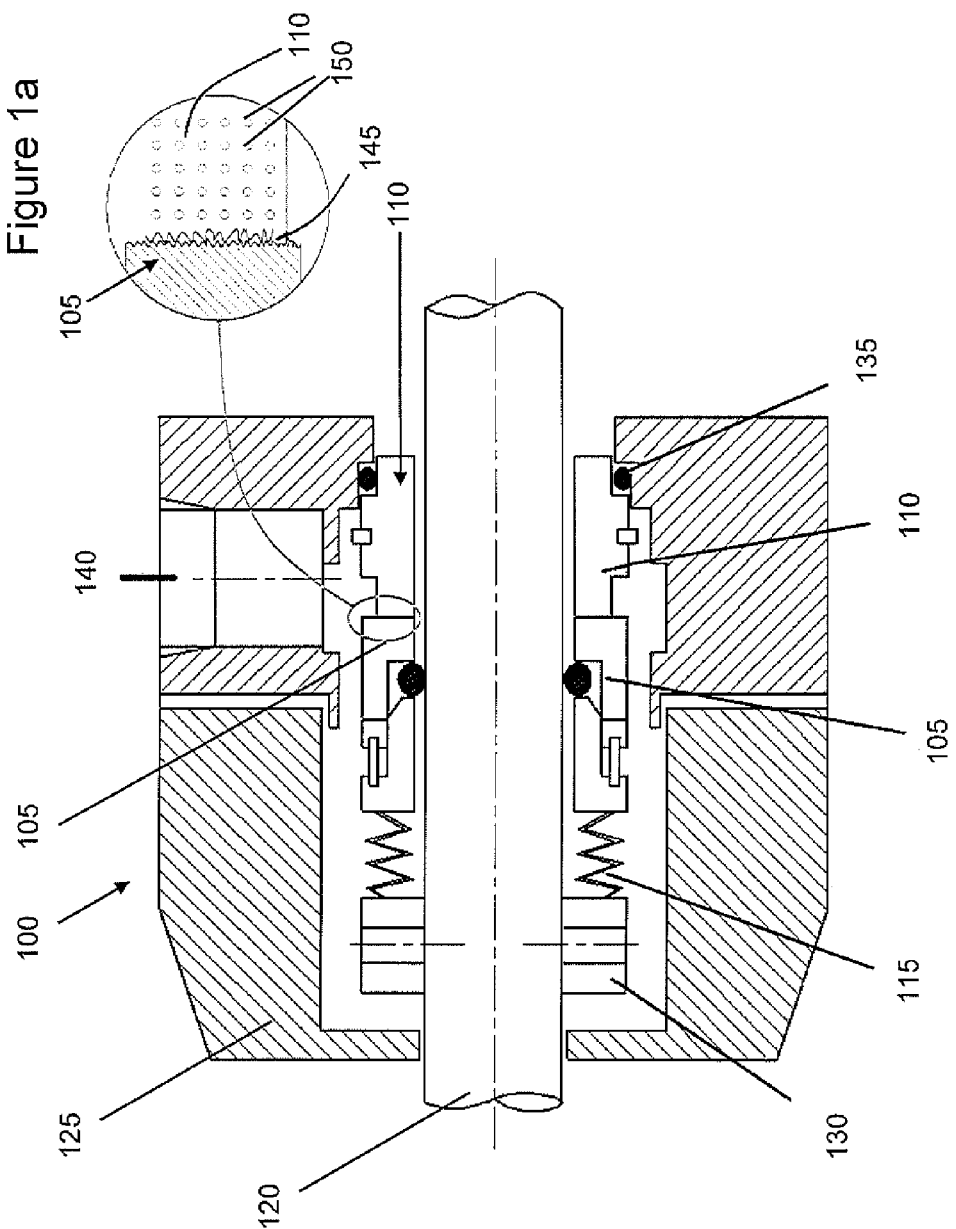
FIG. 1 is a cross-sectional view of a mechanical seal assembly according to an exemplary embodiment of the present invention.

FIG. 1 illustrates a cross-sectional view of mechanical seal assembly 100 according to an exemplary embodiment of the present invention. Seal assembly 100 is a mechanically loaded device including a rotating (primary) ring 105 and a stationary (mating) ring 110, each having lapped faces that operate in close proximity under hydraulic pressure from fluid containment as well as the spring force from spring 115 that pushes the rings together to minimize the leakage between the rotating shaft 120 and the stationary housing 125. Bolt 130 holds shaft 120 in position, and at least one o-ring 135 prevents any internal cooling fluid from leaking out of assembly 100. In certain embodiments, the primary ring may be made of carbon graphite, while the mating ring may be made of ceramic, stainless steel, tungsten carbide, or silicon carbide. External coolant (flush fluid) is supplied via flush nozzle 140 to lubricate and remove heat from the interface between the rotating ring 105 and stationary ring 110. FIG. 1a illustrates a close-up of the interface 145 between rotating ring 105 and stationary ring 110, with the stationary ring 110 having a plurality of dimples 150 formed into the outer circumferential surface of said stationary ring 110.

Figure 2:
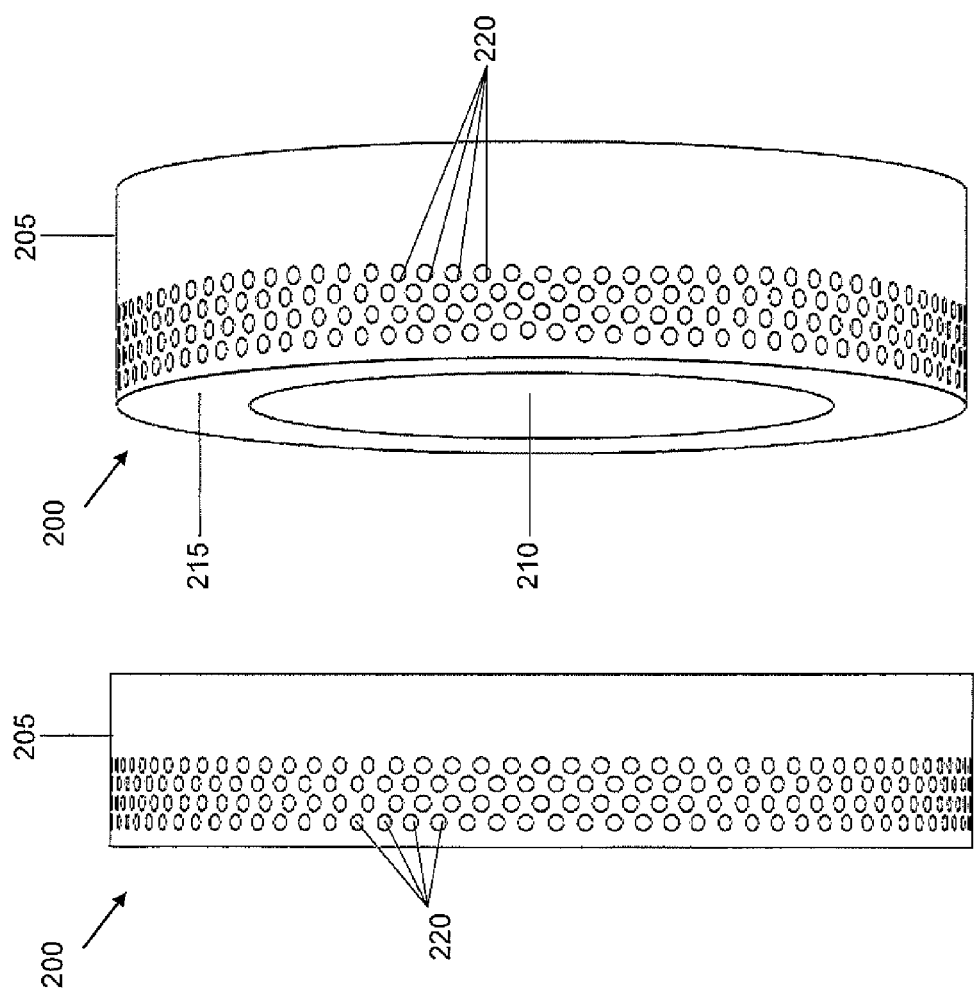

FIGS. 2 and 2a illustrate side and isometric views, respectively, of a stationary or mating ring 200 according to an exemplary embodiment of the present invention. Stationary ring 200 includes an annular body 205 having a central aperture 210 and a sealing face 215. When incorporated into a mechanical seal, such as the one illustrated in FIG. 1, the shaft fits through aperture 210, and sealing face 215 makes contact with the primary (rotating) ring. Dimples 220 are formed into the outer circumferential surface of stationary ring 200 such that the surface area of stationary ring 200 that contacts a cooling fluid when engaged in a mechanical seal assembly is increased. In certain embodiments, dimples 220 may be arranged in one or more circumferential rows around the outer surface of stationary ring 200. In still further embodiments, said circumferential rows of dimples 220 are configured in a "staggered" configuration as illustrated in FIGS. 2 and 2a such that the center of any given dimple 220 in a given circumferential row lines up in the axial direction with the center of the spacing between two adjacent dimples 220 in an adjacent circumferential row. Put another way, in a "staggered" configuration as illustrated in FIGS. 2 and 2a, the center of any given dimple 220 in a circumferential row is approximately equidistant from the centers of two adjacent dimples 220 in an adjacent circumferential row. Because the heat transfer from a stationary ring occurs in the axial and radial directions at a distance of up to twice the sealing face width from the edge of the stationary ring, in certain embodiments, dimples 220 may be arranged such that no dimple 220 is located at a distance from the sealing face edge of stationary ring 220 no greater than twice the sealing face width. In such embodiments, the sealing face width may be defined as the region of the face of the stationary ring 220 that comes into contact with a rotating ring (in a mechanical seal assembly).

To analyze the effectiveness of a dimpled surface mating ring, both physical and computer based simulation experiments were performed to compare the performance of a dimpled surface mating ring according to embodiments of the present invention with that of a conventional texture-free ring. Temperature of interface between primary and mating rings was the primary data collected to verify the effectiveness of this technique.

Experiment

Figure 3:
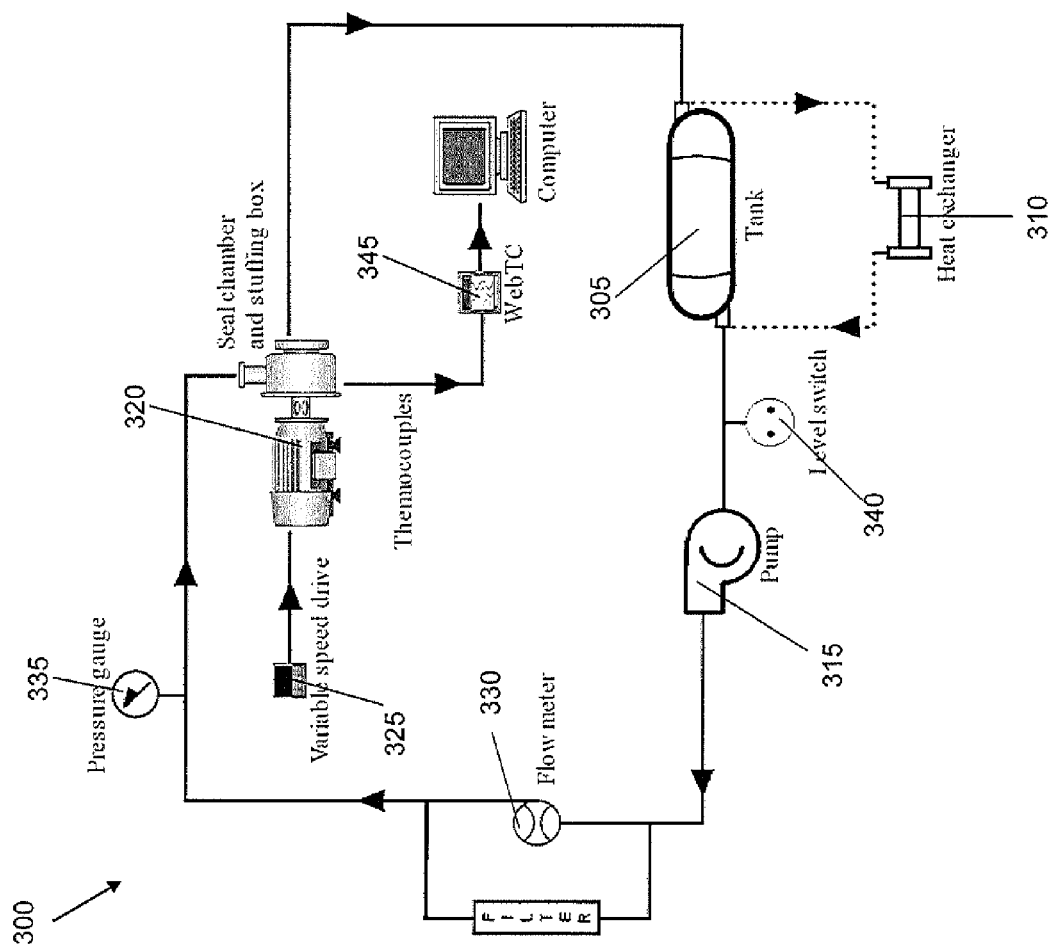
FIG. 3 is a system diagram of an experimental setup of an exemplary embodiment of the present invention.

The schematic of a mechanical seal test rig 300 that complies with API Standard 682 is shown in FIG. 3. This apparatus was used to evaluate the performance of a conventional seal and a seal with a textured mating ring according to an exemplary embodiment of the present invention. The working fluid was diluted propylene glycol solution (70% in water by volume) with a viscosity of 0.0705 poise at 40° C., almost 10 times higher than water at the same temperature. Reservoir 305 provided propylene glycol supply for the simulated pumping housing and coolant for the mechanical seals. Reservoir 305 also had a built-in heat exchanger 310 to cool down the working liquid by water. An AMT cast iron centrifugal pump (Model no. 1626) 315 with maximum feet of head of 93 feet was used. Liquid inlet pressure was 30 psi and the flush rate was 1.7 gpm. The Reynolds number associated with the flush was 2,053 calculated based on the impingement flush rate. The Reynolds number of the primary ring calculated based on the shaft rotational speeds was 4,095 for 1800 rpm and 6,030 for 2,700 rpm. This was an open loop system in which the coolant (flush fluid) flowed over the mating and the primary rings, passed through stuffing box 320, and was then discharged from the right side of stuffing box 320 to tank 305. There was another inlet at the left side of stuffing box 320 whose function was to maintain seal chamber pressure.

Variable speed drive 325 was utilized to change the speed of motor 350 to the designed value.

Flow meter 330 and pressure gage 335 were used to adjust or change the operational point to desired values. Level switch 340, a major safety aspect of the test rig, was configured to monitor and shut down the entire rig in the event of a leak during operation. Specifically, level switch 340 was calibrated so that whenever the glycol in the reservoir fell below the centerline of tank 305, it cut off the power supply. A measurement computing WebTC series data-collection system 345 was connected to record temperatures of the interface between the stationary and rotating rings as well as of the inlet and outlet of working liquid flowing through the simulated pump housing. Six J-type thermocouples (not shown) were circumferentially employed around the mating ring to measure temperature, and their standard limits of error were ±1° C.

In certain embodiments of the present invention, the primary ring and the mating ring are typically made of different materials to minimize interfacial friction and wear. In this experiment, the material selected for the primary ring was carbon graphite. The mating ring was made of stainless steel (17-4 PH), which is precipitation-hardening finish steel, making the properties throughout the material more homogenous. Other advantages of this stainless steel may include high overall strength, good resistance to corrosion, easy to manufacture and low costs. The disadvantages are low thermal conductivity and relatively high surface friction coefficient. See Table 1 for properties, where k is thermal conductivity, P is density and c is specific heat. Since hardness is an important characteristic in reducing the wear rate, the ring was heat treated to have a Rockwell C hardness of 45. Afterwards, its face was lapped to a surface finish between 1-2 helium light bands. One helium light band measures approximately 0.00012 inch (0.000304 m). Six thermocouples holes were drilled through the mating ring from back at the depth of 0.3 mm away from contact face. Thermocouples were circumferentially distributed along the 0.0763 m (3 in.) diameter mating ring, and had diameter of 0.061 m (2.4 in.), 0.0635 m (2.5 in.) and 0.0662 m (2.6 in.), respectively. In other embodiments, the primary and mating rings may be made from any suitable material.

TABLE 1

Materials' properties for Carbon graphite and 17-4 PH

| | K (w/m · K) | ρ (kg/m³) | c (J/kg · K) |
| --- | --- | --- | --- |
| Carbon graphite | 14 | 1825 | 670 |
| 17-4 PH | 18 | 7900 | 419 |

The cylindrical dimples were fabricated by an Electrox laser marking machine with a peak power is 10 kW, but the actual working power was much less than this value. Dimples were engraved into 4 rows, each containing 120 dimples per row and were arranged in a staggered configuration as illustrated in FIGS. 2 and 2a. The diameter of each dimple was about 0.9 mm, and the depth was about 0.12 mm. The depth and diameter ratio (hID) was about 0.13. The center of the first row of dimples was located at 1.2 mm away from the edge of front face. Dimpled were formed onto almost half of the total area of the outer circumference of the mating ring, and thus the total area of the dimpled ring was about 1.13 times larger than that of the conventional mating ring.

Based on the size of pump housing, the test rig was capable of accommodating seals in the range of 0.0445 to 0.0762 m internal diameter. For the purpose of this experiment, a 0.0762 m (3 in) mating ring was selected. In other embodiments of the present invention, the mating ring may be of any suitable size. The primary ring was positioned in relation to the gland and the mating ring. To ensure that the seal face was perpendicular to the shaft, a dial indicator was affixed to a stationary reference and the stem was allowed to slide along the seal face while the shaft was rotated. When the variation of the indicator reading was within ±12.7 μm, the seal face was considered to be perpendicular to the shaft. The spring force of the primary ring exerted 20 psi force on the interface. The newly lapped seal face was allowed to run-in for 24 hours. Once broken in, tests results showed that it took less than 30 minutes to reach steady state. Steady state was assumed when the interface temperature varied less than 0.5° C. in 10 minutes and after running to 3 hours. The WebTC data collecting system acquired data at 1 Hz, which for 3 hours of continuous testing resulted in 10,000 samples per channel.

Both a conventional, smooth ring and a dimpled ring were tested in the rig as described above. Tests were run at 1,800 rpm and 2,700 rpm shaft rotating speed. Inlet flow rate is 1.7 gpm, fluid inlet pressure is 30 psi, and outlet pressure was atmospheric pressure. The working fluid was discharged onto the mating ring through a round nozzle of diameter 0.009 m. This kind of impinging jet typically induces turbulent flows at the nozzle exit. The mechanical (spring) pressure was 20 psi, and the friction coefficient between carbon graphite and stainless steel was estimated at 0.1. The heat generation was a function of spring force, fluid pressure, friction coefficient and rotating speed.

Figure 4:
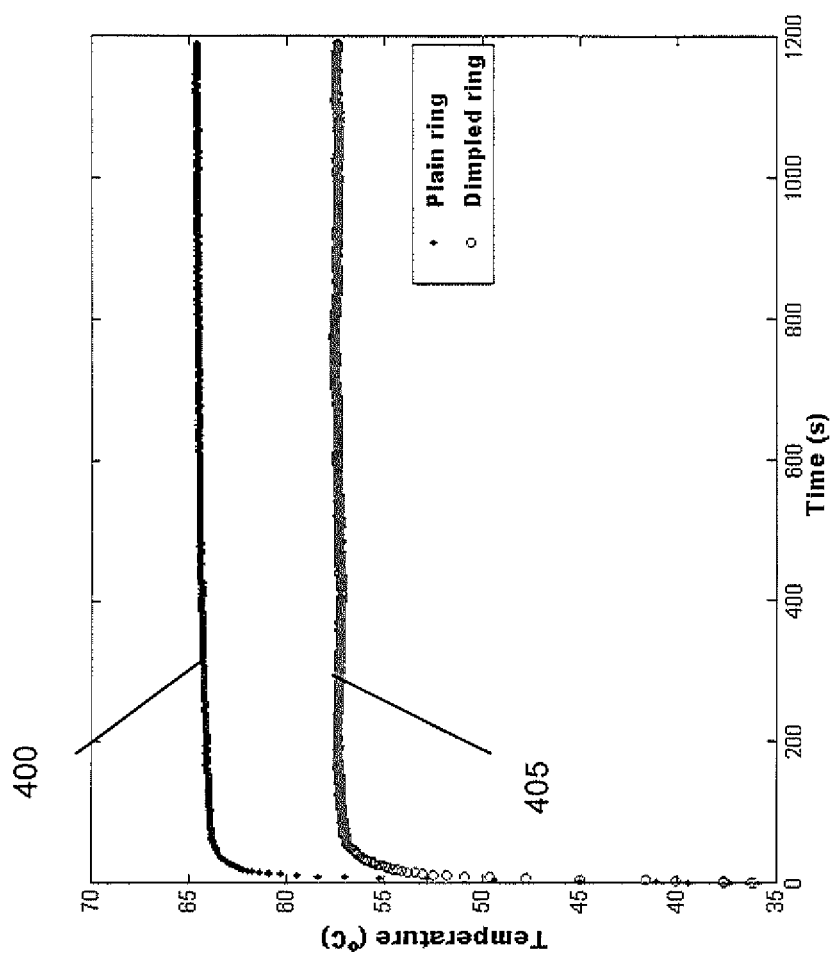
FIG. 4. is a graph illustrating the thermal performance of an exemplary embodiment of the present invention compared to that of a conventional mating ring.

FIG. 4 is a graph of a representative case of measured interface temperature of the mechanical seal comparing the temperature values for a conventional mating ring and a dimpled mating ring. One complete set of temperature data of a conventional ring 400 and one set of temperature data for a dimpled ring 405, taken at the same location (i.e., from the same thermocouple), are combined in FIG. 4 to demonstrate the significant temperature reduction capability of the dimpled ring. The interface temperature for the conventional was as high as 64° C. at 1,800 rpm whereas for the dimpled ring it was reduced to about 58° C. A similar improvement was observed when the rotating speed was increased to 2,700 rpm. The conventional ring ran as high as 77° C., but the dimpled ring exhibited a lower corresponding temperature under 70° C., as seen in Tables 2 and 3.

The results show that in certain embodiments of the present invention the interface temperature can be reduced by more than 10% by using dimpled mating rings. This has important practical implications since less temperature means less thermal stress at the interface and the seals may last longer. Further, by reducing the interface temperature to below the cooling liquid's flashing point, surface damage may be avoided. The drop in the interface temperature was further evidenced by the average outlet and inlet fluid temperatures, which for the dimpled ring was about 0.1° C. higher than for the conventional ring at the same rotating speed and flush rate. This implies that more heat is dissipated to the working fluid or barrier fluid from a seal having a dimpled ring than one employing a conventional ring.

TABLE 2

Comparison of measured interface temperature at 1,800 rpm

|  | 1 | 2 | 3 | 4 | 5 | 6 | Inlet | Outlet |
|---|---|---|---|---|---|---|---|---|
| Plain (° C.) | 61.8 | 61.4 | 63.6 | 64.0 | 63.2 | 62.8 | 40.3 | 40.6 |
| Dimpled (° C.) | 56.2 | 56.5 | 57.1 | 57.8 | 56.8 | 56.9 | 39.2 | 39.6 |

TABLE 3

Comparison of measured interface temperature at 2,700 rpm

|  | 1 | 2 | 3 | 4 | 5 | 6 | Inlet | Outlet |
|---|---|---|---|---|---|---|---|---|
| Plain (° C.) | 72.5 | 70.3 | 76.2 | 77.6 | 76.3 | 75.0 | 41.4 | 42.0 |
| Dimpled (° C.) | 65.5 | 64.8 | 67.6 | 69.1 | 67.3 | 66.7 | 40.1 | 40.8 |

Computer-Based Simulation/Modeling

The commercial CFD software FLUENT (ANSYS 12.1) was employed to predict the steady-state temperature and the flow field of a mechanical seal according to an exemplary embodiment of the present invention. Included in the computational domain were the primary ring, the mating ring, the shaft and the seal chamber. Due to the complex geometry of dimpled surfaces, hybrid elements with triangular faces were used to generate an unstructured mesh to approximate the cylindrical shape of each individual dimple. The interface and the dimpled surface were meshed with fine grids to resolve the high gradients encountered in these regions. A total of 3.74 million finite volume cells for dimpled surface and 2.69 million cells for plain, dimple-free surface were generated for the entire fluid and solid domains. Four circumferential rows of dimples in a staggered configuration were simulated as described in the aforementioned Experiment and as illustrated in FIGS. 2 and 2a.

Propylene glycol solution with constant thermal conductivity, constant specific heat, and constant absolute viscosity was used. All computations were performed using turbulent flow, based on impinging jet flow inlet boundary condition. The boundary condition at the outlet was set to pressure outlet. The energy equation was solved by neglecting radiation effects. Flow was assumed to be at steady-state.

The RNG k-ε model was employed, which was derived using a rigorous statistical technique (called renormalization group theory). It is a refined standard k-ε model known to be more accurate and reliable for a wider class of flows than the standard k-ε model. As for the heat generation, an extremely thin layer was placed between primary and mating rings as a heating element, following the method prescribed in Luan, Z, Khonsari, M. M., Heat transfer correlations for laminar flows within a mechanical seal chamber, Tibology International, 42 (2009) pp 770-778. The heat generation was a function of the pressure $P_m$, the rotational speed V, the friction coefficient of primary and mating rings f, and the interface area evaluated using the following expression.

$$E_p = p_m V A f$$

To reduce numerical errors, the second-order spatial discretization scheme was used, and the implicit solution scheme was adopted. Discrete conservation equations (momentum, energy, etc.) were satisfied in all cells to within a specific tolerance. Once convergence was achieved, solutions no longer changed and the balance equations were satisfied. The settings for the scaled residuals for solution convergence were set to $10^{-3}$ for nearly all computed residuals. The only exception was the residual for the energy equation, which was set to $10^{-6}$. Convergence was assumed to be satisfied when all of the scaled residuals were less than or equal to these default settings. The programs were run on a computer server with Intel Xeon dual core CPU (2.53 GHz) and 16 GB memory (RAM). Generally, less than 1000 iterations were needed for convergence and took roughly 4 hours to complete.

Figure 5:
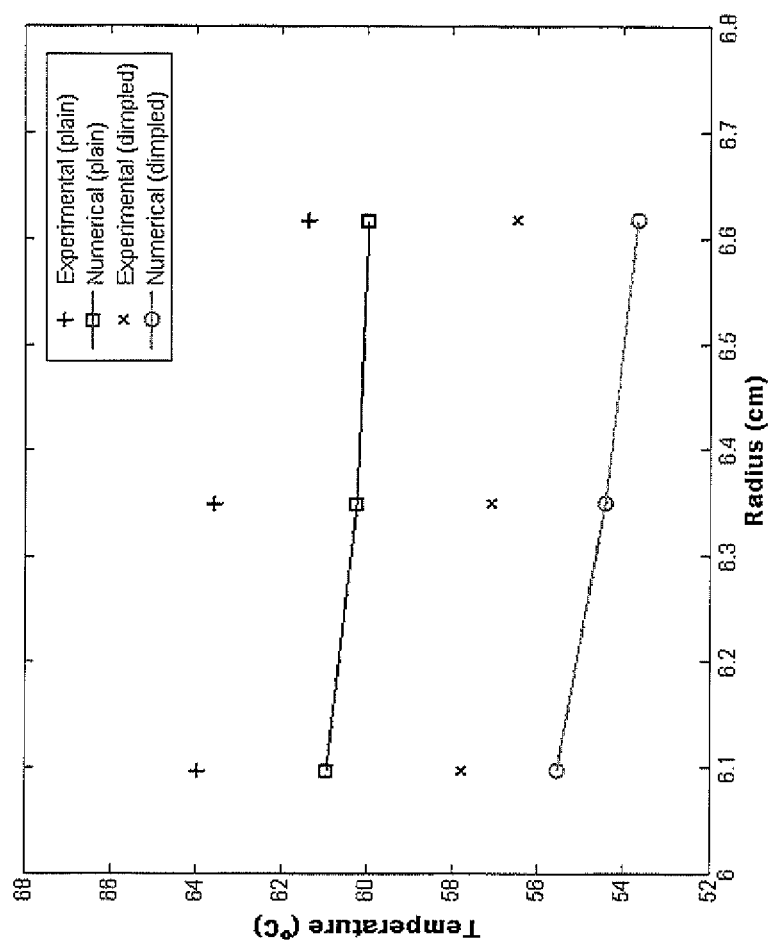
FIGS. 5 and 6 are graphs illustrating the thermal performance of computer simulations of exemplary embodiments of the present invention compared to those of conventional mating rings.

The simulation results closely matched the experimental observation. An exemplary embodiment of the present invention was simulated based on a dimpled ring at 1,800 rpm. The interface temperature distribution was nearly uniform except over the top area, which was cooled by impinging jet flow. Thus, it can be concluded that at steady state, the temperature varies in the radial and axial directions only. The simulations showed that in certain embodiments of the present invention, a secondary flow may form inside the dimples, which circulates inside the dimple, and then is bounced back to the mainstream and mixes with outside flow. The overall heat transfer is thus enhanced due to mixing. FIG. 5 shows the comparison of numerical results and the experimental results at the 1,800 rpm plotted as temperature as a function of mating ring radius. The numerical results shows similar trend as the experimental results and the numerical results show a temperature reduction similar to the experimental results. Some factors that may explain the higher temperatures of the experimental results may include higher than estimated friction coefficient and higher than estimated spring force and fluid pressure.

Figure 6:
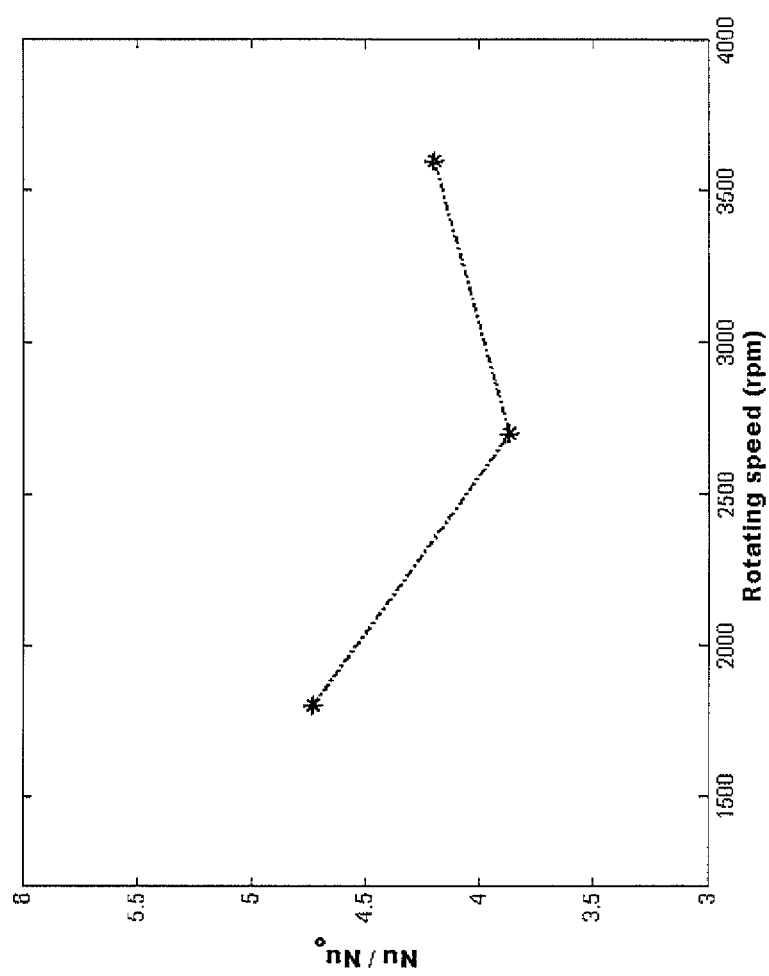

FIG. 6 demonstrates the overall heat augmentation capability using a dimpled ring compared to a plain ring at different rotating speeds. The $Nu_o$ is the baseline Nusselt number, which represents the average Nusselt number of a conventional ring side-wall surface, while Nu is the average Nusselt number of dimpled ring on its side-wall surface. The average Nusselt number over the dimpled mating ring's side-wall is significantly higher than that of the conventional ring. Note that the Nusselt number ratios show a dependence on the primary ring's rotating speed. This may be attributed to flow conditions changing as Reynolds numbers of primary ring increase.

Experimental measurements and CFD simulations have successfully been employed to provide evidence of feasibility of applying dimples in the mating ring of a mechanical seal configured to reducing a seal's interface temperature. Clearly, a dimpled circumferential surface can enhance the heat transfer on the side-wall of a mating ring by increasing the solid-fluid contact area and enhancing mixing. Certain embodiments of the present invention may utilize higher thermal conductivity materials such as silicon carbide. The diffusion of heat is faster in such materials than steel and the surface texture technique can dissipate more heat to the working fluid. In other embodiments, the mating ring may be made of cast iron, stainless steel, Ni-resist, satellite, titanium alloys, ceramic ($Al_2O_3$), silicon nitride, tungsten carbide, graphite composites, or other such suitable materials. The experimental results reveal that under the relatively low fluid pressures tested, the total interface temperature may be reduced by 10% by simply applying this technique. The CFD simulations correspond with the experimental data and can be employed for predictions of industrial seal applications that operate under more severe conditions involving much higher fluid pressures, higher speeds and greater loads, all of which can result in generation of more interfacial heat.

Although the above referenced experiment and simulations illustrate one embodiment of the present invention, other embodiments, including differing the number, size, geometry, and configuration of dimples, as well as other changes, modifications, and substitutions may be made by one having ordinary skill in the art without necessarily departing from the spirit and scope of the invention.

Furthermore, while the embodiments discussed above generally refer to incorporation of a dimpled or other similar texture to the outer surface of a mating ring of a mechanical seal, other embodiments of the present invention may incorporate such texture into the outer surface of the primary ring of a mechanical seal. Implementation of dimples into the sidewall of the rotating ring can similarly improve the overall heat transfer characteristics of a seal and result in the reduction of the interfacial temperature between the rotating and mating rings. Thus, in certain embodiments of the present invention, it is possible to implement dimples in the mating ring alone, the rotating ring alone, or both in the rotating and mating rings. There are two mechanisms for heat transfer in a rotating ring augmented with dimples. They are:

1. additional surface area as and the associated interaction between the fluid and solid wall; and
2. the creation of fluid agitation and mixing caused by the rotation of the dimpled ring which gives rise to formation of turbulent flow and vortexes brought about by the spin of the fluid in and around the dimples. All of these factors, individually and collectively, may contribute to the heat transfer enhancement in the manner that will provide additional interfacial cooling between the two rings.

Additionally, while some of the embodiments described above refer to a dimple having a cylindrical shape, other embodiments of the present invention may include dimples of any suitable geometric shape. Said shapes may be symmetric or asymmetric, circular, ovoid, square, rectangular, or any other geometric shape. Similarly, other embodiments of the present invention may include dimples of any width, depth, area, or volume, and said depth may be uniform or varying across any given dimple. Finally, while some embodiments discussed herein disclose the formation of the dimples via laser, in other embodiments dimples may be formed by any suitable technique, including, but not limited to, etching, pressing, etc.

While the embodiments are described with reference to various implementations and exploitations, it will be understood that these embodiments are illustrative and that the scope of the invention(s) is not limited to them. In general, embodiments of a primary and/or mating ring for a mechanical seal as described herein may be implemented using methods, facilities, and devices consistent with any appropriate structural or mechanical system(s). Many variations, modifications, additions, and improvements are possible.

What is claimed is:

1. A stationary mating ring for a mechanical seal, comprising:
    an annular body having a central axis and a sealing face having a face width; and
    a plurality of dimples formed into an outer circumferential surface of said annular body, wherein the plurality of dimples is spaced away from the sealing face and is configured to increase the exposed circumferential surface area of said annular body;
    wherein the stationary mating ring is configured to form part of the mechanical seal such that the sealing face interfaces with a face of a rotating ring of the mechanical seal;
    wherein the plurality of dimples comprises a plurality of dimple bottoms at a lower extent of the plurality of dimples;
    wherein the plurality of dimples have a plurality of dimple centers and the plurality of dimple centers are located on a sealing face side of the outer circumferential surface; and
    wherein the annular body is a barrier to radial fluid flow.

2. The stationary mating ring of claim 1, wherein each of the plurality of dimples is located no more than about twice the sealing face width from the sealing face in the axial direction.

3. The stationary mating ring of claim 2, wherein the plurality of dimples is arranged in one row about the outer circumference of said annular body.

4. The stationary mating ring of claim 2, wherein the plurality of dimples is arranged in a plurality of rows about the outer circumference of said annular body.

5. The stationary mating ring of claim 4, wherein the plurality of dimples and circumferential rows are arranged in a staggered configuration such that the center of any given dimple in a first circumferential row is approximately equidistant from the centers of two adjacent dimples in second circumferential row adjacent to the first circumferential row.

6. The stationary mating ring of claim 2, wherein each of the plurality of dimples are cylindrical in shape.

7. The stationary mating ring of claim 6, wherein the ratio of depth to diameter of each of the plurality of dimples is about 0.13 and the depth of each of the plurality of dimples is about 0.12 mm.

8. The stationary mating ring of claim 1, wherein the annular body is comprised of at least one of silicon carbide, cast iron, stainless steel, 17-4 PH stainless steel, Ni-resist, satellite, titanium alloys, ceramic ($Al_2O_3$), silicon nitride, tungsten carbide, and a graphite composite.

9. A mechanical seal assembly, comprising:
    (a) a rotating seal ring;
    (b) a stationary mating ring having an annular body with a central axis and a sealing face having a face width;
    (c) a plurality of dimples formed into an outer circumferential surface of said annular body and spaced away from the sealing face,
    wherein the plurality of dimples is configured to increase the exposed circumferential surface area of said annular body; and
    (d) a cooling fluid,
    wherein the sealing face of the stationary mating ring interfaces with a face of the rotating seal ring;
    wherein the plurality of dimples comprises a plurality of dimple bottoms at a lower extent of the plurality of dimples;
    wherein the plurality of dimples have a plurality of dimple centers and the plurality of dimple centers are located on a sealing face side of the outer circumferential surface; and
    wherein said annular body is a barrier to radial fluid flow.

10. The mechanical seal assembly of claim 9, wherein each of the plurality of dimples is located no more than about twice the sealing face width from the sealing face in the axial direction.

11. The mechanical seal assembly of claim 10, wherein the plurality of dimples is arranged in one row about the outer circumference of said annular body.

12. The mechanical seal assembly of claim 10, wherein the plurality of dimples is arranged in a plurality of rows about the outer circumference of said annular body.

13. The mechanical seal assembly of claim 12, wherein the plurality of dimples and circumferential rows are arranged in a staggered configuration such that the center of any given dimple in a first circumferential row is approximately equidistant from the centers of two adjacent dimples in second circumferential row adjacent to the first circumferential row.

14. The mechanical seal assembly of claim 10, wherein each of the plurality of dimples are cylindrical in shape.

15. The stationary mating ring of claim 14, wherein the ratio of depth to diameter of each of the plurality of dimples is about 0.13.

16. The mechanical seal assembly of claim 9, wherein the annular body is of at least one of silicon carbide, cast iron, stainless steel, 17-4 PH steel, Ni-resist, satellite, titanium alloys, ceramic ($Al_2O_3$), silicon nitride, tungsten carbide, and graphite composite.

17. The mechanical seal assembly of claim 9, further comprising a plurality of dimples formed into an outer circumferential surface of said rotating seal ring.

18. A method, comprising:
forming a plurality of dimples into an outer circumferential surface of a mating ring for a mechanical seal,
wherein the plurality of dimples is configured to increase the exposed circumferential surface area of said mating ring, and
wherein the mating ring is configured to form part of the mechanical seal such that a sealing face of the mating ring interfaces with a face of a rotating ring of the mechanical seal;
wherein the plurality of dimples is spaced away from the sealing face of the mating ring;
wherein the plurality of dimples comprises a plurality of dimple bottoms at a lower extent of the plurality of dimples;
wherein the plurality of dimples have a plurality of dimple centers and the plurality of dimple centers are located on a sealing face side of the outer circumferential surface; and
wherein the mating ring is a barrier to radial fluid flow.

19. The method of claim 17, wherein the plurality of dimples is formed into the outer surface of the mating ring with a laser.

20. The method of claim 17, wherein each of the plurality of dimples is located no more than about twice the sealing face width from the sealing face in the axial direction.

21. The method of claim 20, wherein the plurality of dimples is arranged in one row about the outer circumference of the mating ring.

22. The method of claim 21, wherein the plurality of dimples is arranged in a plurality of rows about the outer circumference of the mating ring.

23. The method of claim 22, wherein the plurality of dimples and circumferential rows are arranged in a staggered configuration such that the center of any given dimple in a first circumferential row is approximately equidistant from the centers of two adjacent dimples in second circumferential row adjacent to the first circumferential row.

24. The method of claim 20, wherein each of the plurality of dimples are cylindrical in shape.

25. The method of claim 24, wherein the ratio of depth to diameter of each of the plurality of dimples is about 0.13.

26. The method of claim 18, wherein the mating ring is comprised of at least one of silicon carbide, cast iron, stainless steel, 17-4 PH stainless steel, Ni-resist, satellite, titanium alloys, ceramic ($Al_2O_3$), silicon nitride, tungsten carbide, and a graphite composite.

27. A rotating ring for a mechanical seal, comprising:
an annular body having a central axis and a sealing face having a face width; and
a plurality of dimples formed into an outer circumferential surface of said annular body, wherein the plurality of dimples is spaced away from the sealing face and is configured to increase the exposed circumferential surface area of said annular body, and
wherein the rotating ring is configured to form part of the mechanical seal such that the sealing face interfaces with a face of a stationary ring of the mechanical seal;
wherein the plurality of dimples comprises a plurality of dimple bottoms at a lower extent of the plurality of dimples;
wherein the plurality of dimples have a plurality of dimple centers and the plurality of dimple centers are located on a sealing face side of the outer circumferential surface; and
wherein said annular body is a barrier to radial fluid flow.

28. The rotating ring of claim 27, wherein each of the plurality of dimples is located no more than about twice the face width from the sealing face in the axial direction.

29. The rotating ring of claim 28, wherein the plurality of dimples is arranged in one row about the outer circumference of said annular body.

30. The rotating ring of claim 28, wherein the plurality of dimples is arranged in a plurality of rows about the outer circumference of said annular body.

31. The rotating ring of claim 30, wherein the plurality of dimples and circumferential rows are arranged in a staggered configuration such that the center of any given dimple in a first circumferential row is approximately equidistant from the centers of two adjacent dimples in second circumferential row adjacent to the first circumferential row.

32. The rotating ring of claim 28, wherein each of the plurality of dimples are cylindrical in shape.

33. The rotating ring of claim 32, wherein the ratio of depth to diameter of each of the plurality of dimples is about 0.13.

34. The rotating ring of claim 27, wherein the annular body is comprised of at least one of carbon graphite, silicon carbide, cast iron, stainless steel, 17-4 PH stainless steel, Ni-resist, satellite, titanium alloys, ceramic ($Al_2O_3$), silicon nitride, tungsten carbide, and a graphite composite.

35. A method, comprising:
forming a plurality of dimples into an outer circumferential surface of a rotating ring for a mechanical seal,
wherein the plurality of dimples is configured to increase the exposed circumferential surface area of said rotating ring, and
wherein the rotating ring is configured to form part of the mechanical seal such that a sealing face of the rotating ring interfaces with a face of a mating ring of the mechanical seal; and wherein the plurality of dimples is spaced away from the sealing face of the rotating ring;
wherein the plurality of dimples comprises a plurality of dimple bottoms at a lower extent of the plurality of dimples;
wherein the plurality of dimples have a plurality of dimple centers and the plurality of dimple centers are located on a sealing face side of the outer circumferential surface; and
wherein the rotating ring is a barrier to radial fluid flow.

36. The method of claim 35, wherein the plurality of dimples is formed into the outer circumferential surface of the rotating ring with a laser.

37. The method of claim 35, wherein each of the plurality of dimples is located no more than about twice the sealing face width from the sealing face in the axial direction.

38. The method of claim 37, wherein the plurality of dimples is arranged in one row about the outer circumference of the rotating ring.

39. The method of claim 37, wherein the plurality of dimples is arranged in a plurality of rows about the outer circumference of the rotating ring.

40. The method of claim 39, wherein the plurality of dimples and circumferential rows are arranged in a staggered configuration such that the center of any given dimple in a first circumferential row is approximately equidistant from the centers of two adjacent dimples in second circumferential row adjacent to the first circumferential row.

41. The method of claim 37, wherein each of the plurality of dimples are cylindrical in shape.

42. The method of claim 40, wherein the ratio of depth to diameter of each of the plurality of dimples is about 0.13.

43. The method of claim 35, wherein the rotating ring is comprised of at least one of carbon graphite, silicon carbide, cast iron, stainless steel, 17-4 PH stainless steel, Ni-resist, satellite, titanium alloys, ceramic ($Al_2O_3$), silicon nitride, tungsten carbide, and a graphite composite.

\* \* \* \* \*